J. W. NISSROD.
STUMP PULLER.
APPLICATION FILED NOV. 22, 1920.

1,396,657.

Patented Nov. 8, 1921.

John W. Nissrod
INVENTOR.

Witness

BY
Geo. Kimmel
ATTORNEY.

UNITED STATES PATENT OFFICE.

JOHN W. NISSROD, OF JACKSONVILLE, FLORIDA.

STUMP-PULLER.

1,396,657.  Specification of Letters Patent.  Patented Nov. 8, 1921.

Application filed November 22, 1920. Serial No. 425,709.

*To all whom it may concern:*

Be it known that I, JOHN WILLIAM NISSROD, a citizen of the United States, residing at Jacksonville, in the county of Duval and State of Florida, have invented certain new and useful Improvements in Stump-Pullers, of which the following is a specification.

This invention relates to stump pulling devices and more particularly to the class of stump pullers adapted to loosen the earth beneath the stump and roots to enable the same to be more readily extracted from the ground.

One of the objects of my invention is the construction of a device of the above class wherein the stump pulling means may be adjusted to accommodate various size stumps to be extracted.

Another object of the invention resides in the provision of a novel form of attaching means for the root hooks and beams with respect to the axle of the machine to permit both lateral and vertical movement of the stump pulling devices.

A still further object of the invention is directed to a wheel supported stump puller and novel attaching means mounted on the axle thereof for permitting lateral and vertical movement of the stump pulling means including provision for applying draft power to the machine.

With these objects in view and others which will be manifest and suggested as the nature and purpose of the invention are revealed in the following specification and drawing wherein I have shown a practical, yet preferred embodiment thereof—

Figure 1:
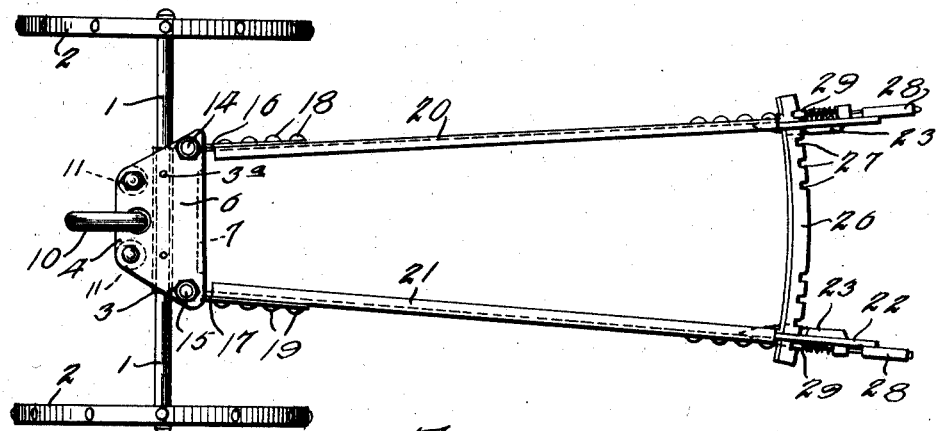
Figure 1 is a plan view of the device.

Referring now to the drawing 1 designates the axle which carries the ground wheels 2 on its respective ends whereby the machine may be transported and moved from place to place in the field. The axle 1 passes through a sleeve 3 which is secured as at 3ª and confined between a trapezoidal harness plate 4, the purpose and use of which will now be set forth.

Figure 3:
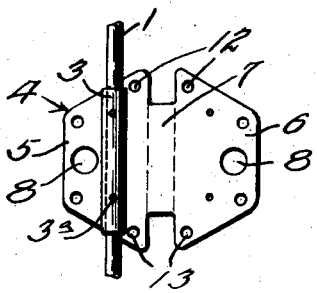
Fig. 3 is a detail view of the harness plate unfolded.
Figure 4:
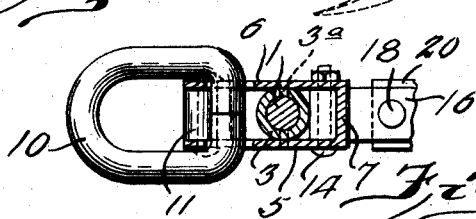
Fig. 4 is a view taken on the line 4—4 of Fig. 1.

In its open or unfolded form as shown in Fig. 3, the harness plate comprises two similar and complementary portions 5, 6, connected as at 7 so that when the plate is folded, it presents a true trapezoid with an upper and lower plate sufficiently spaced apart, however to receive the sleeve and the axle above referred to. An enlarged aperture 8 centrally disposed in the harness plate receives the clevis 10 thereto to readily permit attachment of the necessary stump puller. Suitable spacers 11 are also inserted between the upper and lower portions 5, 6 of the plate to prevent the same from binding on the sleeve and axle.

Figure 2:
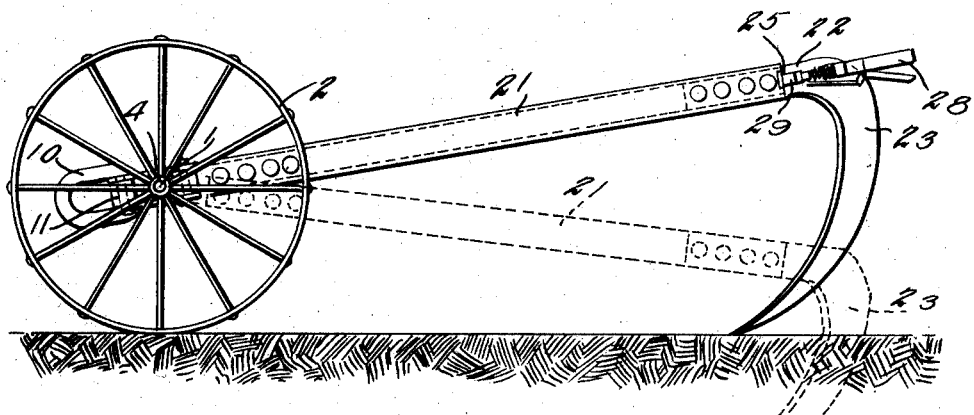
Fig. 2 is a side view.

In the apertures 12, 13 formed in the opposite corners of the harness plate, vertical hinge bolts 14, 15 connect the hinge bars 16, 17 to the said plate, the said bars 16, 17 being riveted or otherwise permanently secured as at 18, 19 to the rearwardly extending beams 20, 21 which are preferably of angle iron. In this manner it will be readily seen that the beams may be swung laterally toward or away from each other and also upwardly or downwardly with the harness plate as clearly shown in Fig. 2 of the drawing.

Riveted to the rear extremities of each of the respective beams 20, 21 are the shank portions 22 of the curved root hooks 23. The shank portions are slotted at 25 to receive the ends of a curved rack bar 26 having notches 27 therein. A spring pressed lever and dog 28, 29 carried by the root hooks is adapted to engage within the notches of the rack bar to permit the simultaneous or independent adjustment of the beams laterally.

In the operation of the device in extracting stumps, the machine is placed approximately within six or eight feet of the stump and the side beams are adjusted toward or away from each other depending on the size of the stump. A cable is hooked to the clevis and the operator guides the hooks into the soil and as the hooks dig into the ground of their own accord the machine is permitted to do its own work, thus avoiding possible injury to the operator due to any unexpected springing of the roots. It will be apparent that the hooks digging deeply into the ground thoroughly loosen the earth about the stump and the roots thus enabling the same to be extracted with a minimum amount of power.

In the accompanying drawing, I have illustrated my invention embodied in one form by way of example, and which in practice has been found to be highly satisfactory in obtaining the desired results. It will be obvious however that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

What I claim is:

1. In a stump pulling machine of the class described, a movable support, a harness plate pivoted to said support, a pair of beams connected to said plate and root hooks carried at the ends of said beams.

2. In a stump pulling machine of the class described, a movable support, a harness plate pivoted to said support, vertically pivoted beams connected to said plate, hooks carried at the ends of said beams and means to laterally adjust said beams with respect to each other.

3. In a stump pulling machine of the class described, a movable support, a harness plate vertically pivoted to said support, a pair of independent and vertically pivoted beams connected to the rear corners of said plate, downwardly curved hooks having attaching shanks connected to the ends of said beams, a curved rack bar carried by said shanks, and means to laterally adjust said beams on said rack bar.

4. In a stump pulling machine of the class described, a wheeled support, an axle, a sleeve carried by said axle, a trapezoidal harness plate pivoted to and confining a portion of the axle and sleeve, vertically pivoted beams connected to said plate, hooks having attaching shanks connected to the rear ends of the beams, a curved rack bar carried by said shank portions and a lever and dog mechanism on the curved hooks for laterally adjusting the said beams toward or away from each other.

5. In a stump pulling machine of the class described, a wheeled support, an axle, a sleeve carried by said axle, a trapezoidal harness plate pivoted to and confining said sleeve and a portion of the axle, spacing elements interposed between the upper and lower portions of said plate, a clevis pivoted to the front intermediate portion of said plate, hinge bars pivotally connected to the rear corners of said plate, rearwardly extending beams connected to said attaching plate, downwardly curved hooks having attaching shanks connected to the rear extremities of said beams, a curved, transverse rack bar passing through apertures in said attaching shanks, a lever and spring actuated dog mechanism carried by said curved hooks whereby the said beams may be simultaneously or independently adjusted toward or away from each other.

In testimony whereof, I affix my signature hereto.

J. W. NISSROD.